United States Patent
Yu

(10) Patent No.: US 11,742,914 B2
(45) Date of Patent: Aug. 29, 2023

(54) COMMUNICATION METHOD BASED ON ORBITAL ANGULAR MOMENTUM AND RELATED APPARATUS

(71) Applicant: Huawei Technologies Co., Ltd., Guangdong (CN)

(72) Inventor: Rongdao Yu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/743,638

(22) Filed: May 13, 2022

(65) Prior Publication Data

US 2022/0278723 A1 Sep. 1, 2022

Related U.S. Application Data

(63) Continuation of application No. PCT/CN2020/095651, filed on Jun. 11, 2020.

(30) Foreign Application Priority Data

Nov. 15, 2019 (CN) .......................... 201911120944.1

(51) Int. Cl.
*H04B 7/06* (2006.01)
(52) U.S. Cl.
CPC ................... *H04B 7/0617* (2013.01)
(58) Field of Classification Search
CPC ........... H04B 7/0617; H04B 7/02; H04L 1/00; H04L 5/00

USPC ........................................................ 375/267
See application file for complete search history.

(56) References Cited

U.S. PATENT DOCUMENTS

| | | | |
|---|---|---|---|
| 2015/0333865 A1 | 11/2015 | Yu et al. | |
| 2016/0044647 A1 | 2/2016 | Ashrafi et al. | |
| 2016/0204896 A1 | 7/2016 | Yu et al. | |
| 2017/0117626 A1 | 4/2017 | Sajuyigbe et al. | |
| 2019/0069187 A1 | 2/2019 | Ashrafi | |
| 2022/0078780 A1* | 3/2022 | Choi | H04B 7/0456 |

FOREIGN PATENT DOCUMENTS

| | | |
|---|---|---|
| CN | 106357317 A | 1/2017 |
| CN | 106664194 A | 5/2017 |
| CN | 108540256 A | 9/2018 |
| CN | 108566356 A | 9/2018 |
| CN | 110138438 A | 8/2019 |
| EP | 3066809 B1 | 10/2021 |

* cited by examiner

*Primary Examiner* — Fitwi Y Hailegiorgis
(74) *Attorney, Agent, or Firm* — WOMBLE BOND DICKINSON (US) LLP

(57) ABSTRACT

This application provides a communication method based on orbital angular momentum (OAM) and a related apparatus. The method includes: determining OAM modes for at least two subframes of a radio frame, where at least one symbol is mapped to each subframe in the at least two subframes; and sending the at least two subframes, where there is an association relationship between the OAM modes corresponding to the subframes in the at least two subframes. Embodiments of this application are implemented to enhance an electromagnetic field, reduce signal fading, and improve a diversity effect.

20 Claims, 10 Drawing Sheets

COMMUNICATION METHOD BASED ON ORBITAL ANGULAR MOMENTUM AND RELATED APPARATUS

CROSS-REFERENCE TO RELATED APPLICATIONS

This application is a continuation of International Application No. PCT/CN2020/095651, filed on Jun. 11, 2020, which claims priority to Chinese Patent Application No. 201911120944.1, filed on Nov. 15, 2019. The disclosures of the aforementioned applications are hereby incorporated by reference in their entireties.

TECHNICAL FIELD

This application relates to the field of communication technologies, and in particular, to a communication method based on orbital angular momentum (OAM) and a related apparatus.

BACKGROUND

Currently, to improve a diversity effect and reduce an impact of multipath fading, a diversity technology is used during signal transmission. For example, a signal is mapped to a plurality of subframes of a radio frame (RF) for transmission. In this transmission manner, only a same signal is repeatedly sent, or only a same electromagnetic wave is repeatedly sent. Further, electromagnetic fields, wavelengths, frequencies, and the like of the electromagnetic waves are the same. However, during transmission, the electromagnetic waves do not interact with each other. As a result, the electromagnetic field is not enhanced, and signal fading is the same as signal fading existing when a single signal is transmitted. Therefore, in a conventional technology, a diversity effect is poor.

SUMMARY

This application provides a communication method based on OAM and a related apparatus, to enhance an electromagnetic field, reduce signal fading, and improve a diversity effect.

According to a first aspect, this application provides a communication method based on OAM, including: determining OAM modes for at least two subframes of a radio frame, where at least one symbol is mapped to each subframe in the at least two subframes; and sending the at least two subframes, where there is an association relationship between OAM modes corresponding to the subframes in the at least two subframes.

The at least one symbol may be at least one complex symbol of a first signal, the first signal is a first bit sequence transmitted on a broadcast channel (BCH), and the complex symbol is a modulation symbol that is modulated through quadrature phase shift keying (quadrature phase shift keying, QPSK).

Further, each symbol in the at least one symbol may further include one of the following: a primary synchronization signal (PSS) or a secondary synchronization signal (SSS).

It may be learned that, in the foregoing technical solution, the OAM modes are determined for the at least two subframes, and there is an association relationship between the OAM modes corresponding to the subframes in the at least two subframes. Therefore, in a process of sending the at least two subframes, electromagnetic waves interact with each other, to enhance an electromagnetic field, reduce signal fading, and improve a diversity effect.

In an embodiment, OAM modes corresponding to adjacent subframes in the at least two subframes are different. The adjacent subframes include subframes whose sending times are adjacent to each other, and the sending time is a time for sending the subframe.

It may be learned that the OAM modes corresponding to the adjacent subframes in the at least two subframes are different. Therefore, when the at least two subframes are sent, electromagnetic waves interact with each other, to enhance an electromagnetic field, reduce signal fading, and improve a diversity effect.

In an embodiment, the OAM modes corresponding to the subframes in the at least two subframes are different. It may be learned that the OAM modes corresponding to the subframes in the at least two subframes are different. Therefore, when the at least two subframes are sent, electromagnetic waves interact with each other, to enhance an electromagnetic field, reduce signal fading, and improve a diversity effect.

In an embodiment, the OAM mode corresponding to each subframe in the at least two subframes meets the following formula: (ml+nΔl), where both m and n are integers, l is an OAM mode in a first OAM mode sequence, and when a quantity of OAM modes corresponding to the first OAM mode sequence is 1, Δl is 0, or when a quantity of OAM modes corresponding to the first OAM mode sequence is greater than or equal to 2, Δl is a difference between adjacent OAM modes in the first OAM mode sequence.

It may be learned that, in the foregoing technical solution, the OAM mode corresponding to each subframe in the at least two subframes meets the foregoing formula, so that a manner of determining the OAM mode corresponding to each subframe is enriched.

In an embodiment, the first OAM mode sequence includes k OAM modes, and when k is 1, each OAM mode in the k OAM modes is a non-zero integer, or when k is greater than or equal to 2, each OAM mode in the k OAM modes is a non-zero integer, and the k OAM modes are different from each other.

It may be learned that, in the foregoing technical solution, an OAM mode included in the first OAM mode sequence is determined based on different quantities of OAM modes included in the first OAM mode sequence, to prepare for subsequent improvement of a diversity effect.

In an embodiment, when k is an even number greater than or equal to 2, the first OAM mode sequence includes $$\frac{k}{2}$$

pairs of OAM modes; or when k is an odd number greater than 2, the first OAM mode sequence includes $$\frac{k-1}{2}$$

pairs of OAM modes, where each pair of OAM modes in the $$\frac{k}{2}$$

pairs of OAM Modes and the $$\frac{k-1}{2}$$

pairs of OAM modes has opposite wavefront phases.

It may be learned that, in the foregoing technical solution, a quantity of pairs of OAM modes included in the first OAM mode sequence is determined based on different quantities of OAM modes included in the first OAM mode sequence, and it is determined that each pair of OAM modes has opposite wavefront phases, to prepare for subsequent improvement of a diversity effect.

In an embodiment, before the sending the at least two subframes, the method further includes: sending first information, where the first information includes a first field and an initial OAM mode in the first OAM mode sequence, and the first field is used to indicate Δl, or the first field is reused to indicate Δl and a first subcarrier spacing.

It may be learned that, in the foregoing technical solution, the first information is sent, so that a terminal obtains the first information. In addition, the first field is used to indicate Δl or is reused to indicate Δl and the first subcarrier spacing, so that overheads are reduced.

In an embodiment, the sending first information includes: sending the first information by using a system information block, radio resource control signaling, or downlink control information.

It may be learned that, in the foregoing technical solution, a manner of sending the first information is enriched.

In an embodiment, the method further includes: obtaining a frequency shift of an uplink reference signal; and if the frequency shift of the uplink reference signal is less than or equal to a first frequency shift, sending a second OAM mode sequence, or an initial OAM mode in the second OAM mode sequence and a difference between adjacent OAM modes in the second OAM mode sequence, where the difference between the adjacent OAM modes in the second OAM mode sequence is less than the difference between the adjacent OAM modes in the first OAM mode sequence; or if the frequency shift of the uplink reference signal is greater than the first frequency shift, sending a third OAM mode sequence, or an initial OAM mode in the third OAM mode sequence and a difference between adjacent OAM modes in the third OAM mode sequence, where the difference between the adjacent OAM modes in the third OAM mode sequence is greater than the difference between the adjacent OAM modes in the first OAM mode, and the difference between the adjacent OAM modes in the third OAM mode sequence is greater than the difference between the adjacent OAM modes in the second OAM mode sequence.

The uplink reference signal includes a demodulation reference signal (DMRS) and/or a sounding reference signal (SRS).

It may be learned that, in the foregoing technical solution, a relationship between the frequency shift of the uplink reference signal and the first frequency shift is determined, to send different OAM mode sequences, or send different initial OAM modes and differences between adjacent OAM modes in different OAM mode sequences. This improves signal transmission reliability.

In an embodiment, the method further includes: sending second information, where the second information includes a second field and the initial OAM mode in the second OAM mode sequence, or the second information includes the second field and the initial OAM mode in the third OAM mode sequence, where the second field is used to indicate the difference between the adjacent OAM modes in the second OAM mode sequence or the difference between the adjacent OAM modes in the third OAM mode sequence, or the second field is reused to indicate the difference between the adjacent OAM modes in the second OAM mode sequence and a second subcarrier spacing, or the difference between the adjacent OAM modes in the third OAM mode sequence and a third subcarrier spacing.

It may be learned that, in the foregoing technical solution, the second information is sent, so that the terminal obtains the second information. In addition, the second field is used or reused to indicate different information, so that overheads are reduced.

In an embodiment, the sending second information includes: sending the second information by using a system information block, radio resource control signaling, or downlink control information.

It may be learned that, in the foregoing technical solution, a manner of sending the second information is enriched.

According to a second aspect, this application provides a communication method based on OAM, including: receiving a radio frame, where the radio frame includes at least two subframes, at least one symbol is mapped to each subframe in the at least two subframes, and there is an association relationship between OAM modes corresponding to the subframes in the at least two subframes; and demodulating the radio frame based on the association relationship between the OAM modes corresponding to the subframes in the at least two subframes.

The at least one symbol may be at least one complex symbol of a first signal, the first signal is a first bit sequence transmitted on a BCH, and the complex symbol is a modulation symbol that is modulated through QPSK.

Further, each symbol in the at least one symbol may further include one of the following: a PSS or an SSS.

It may be learned that, in the foregoing technical solution, the radio frame includes the at least two subframes, and there is an association relationship between the OAM modes corresponding to the subframes in the at least two subframes. Therefore, in a process of sending the at least two subframes, electromagnetic waves interact with each other, to enhance an electromagnetic field, reduce signal fading, and improve a diversity effect. In this way, a receive diversity gain existing when a terminal receives the radio frame is increased. Further, the radio frame is also demodulated based on the association relationship between the OAM modes corresponding to the subframes in the at least two subframes.

In an embodiment, OAM modes corresponding to adjacent subframes in the at least two subframes are different. The adjacent subframes include subframes whose sending times are adjacent to each other, and the sending time is a time for sending the subframe.

It may be learned that the OAM modes corresponding to the adjacent subframes in the at least two subframes are different. Therefore, when the at least two subframes are sent, electromagnetic waves interact with each other, to enhance an electromagnetic field, reduce signal fading, and improve a diversity effect.

In an embodiment, the OAM modes corresponding to the subframes in the at least two subframes are different. It may be learned that the OAM modes corresponding to the subframes in the at least two subframes are different. Therefore, when the at least two subframes are sent, electromagnetic waves interact with each other, to enhance an electromagnetic field, reduce signal fading, and improve a diversity effect.

In an embodiment, the OAM mode corresponding to each subframe in the at least two subframes meets the following formula: (ml+nΔl), where both m and n are integers, l is an OAM mode in a first OAM mode sequence, and when a quantity of OAM modes corresponding to the first OAM mode sequence is 1, Δl is 0, or when a quantity of OAM modes corresponding to the first OAM mode sequence is greater than or equal to 2, Δl is a difference between adjacent OAM modes in the first OAM mode sequence.

It may be learned that, in the foregoing technical solution, the OAM mode corresponding to each subframe in the at least two subframes meets the foregoing formula, so that a manner of determining the OAM mode corresponding to each subframe is enriched.

In an embodiment, the first OAM mode sequence includes k OAM modes, and when k is 1, each OAM mode in the k OAM modes is a non-zero integer, or when k is greater than or equal to 2, each OAM mode in the k OAM modes is a non-zero integer, and the k OAM modes are different from each other.

It may be learned that, in the foregoing technical solution, an OAM mode included in the first OAM mode sequence is determined based on different quantities of OAM modes included in the first OAM mode sequence, to prepare for subsequent improvement of a diversity effect.

In an embodiment, when k is an even number greater than or equal to 2, the first OAM mode sequence includes $$\frac{k}{2}$$

pairs or OAM modes; or when k is an odd number greater than 2, the first OAM mode sequence includes $$\frac{k-1}{2}$$

pairs of OAM modes, where each pair of OAM modes in the $$\frac{k}{2}$$

pairs or OAM modes and the $$\frac{k-1}{2}$$

pairs of OAM modes has opposite wavefront phases.

It may be learned that, in the foregoing technical solution, a quantity of pairs of OAM modes included in the first OAM mode sequence is determined based on different quantities of OAM modes included in the first OAM mode sequence, and it is determined that each pair of OAM modes has opposite wavefront phases, to prepare for subsequent improvement of a diversity effect.

In an embodiment, the method further includes: receiving first information, where the first information includes a first field and an initial OAM mode in the first OAM mode sequence, and the first field is used to indicate Δl, or the first field is reused to indicate Δl and a first subcarrier spacing.

It may be learned that, in the foregoing technical solution, the terminal obtains the first information. In addition, the first field is used to indicate Δl or is reused to indicate Δl and the first subcarrier spacing, so that overheads are reduced.

In an embodiment, the receiving first information includes: receiving the first information by using a system information block, radio resource control signaling, or downlink control information.

It may be learned that, in the foregoing technical solution, a manner of obtaining the first information is enriched.

In an embodiment, the method further includes: receiving a second OAM mode sequence, or an initial OAM mode in the second OAM mode sequence and a difference between adjacent OAM modes in the second OAM mode sequence, where the difference between the adjacent OAM modes in the second OAM mode sequence is less than the difference between the adjacent OAM modes in the first OAM mode sequence; or receiving a third OAM mode sequence, or an initial OAM mode in the third OAM mode sequence and a difference between adjacent OAM modes in the third OAM mode sequence, where the difference between the adjacent OAM modes in the third OAM mode sequence is greater than the difference between the adjacent OAM modes in the first OAM mode, and the difference between the adjacent OAM modes in the third OAM mode sequence is greater than the difference between the adjacent OAM modes in the second OAM mode sequence.

The uplink reference signal includes a demodulation reference signal (DMRS) and/or a sounding reference signal (SRS).

It may be learned that, in the foregoing technical solution, a relationship between the frequency shift of the uplink reference signal and the first frequency shift is determined, to obtain different OAM mode sequences, or obtain different initial OAM modes and differences between adjacent OAM modes in different OAM mode sequences. This improves signal transmission reliability.

In an embodiment, the method further includes: receiving second information, where the second information includes a second field and the initial OAM mode in the second OAM mode sequence, or the second information includes the second field and the initial OAM mode in the third OAM mode sequence, where the second field is used to indicate the difference between the adjacent OAM modes in the second OAM mode sequence or the difference between the adjacent OAM modes in the third OAM mode sequence, or the second field is reused to indicate the difference between the adjacent OAM modes in the second OAM mode sequence and a second subcarrier spacing, or the difference between the adjacent OAM modes in the third OAM mode sequence and a third subcarrier spacing.

It may be learned that, in the foregoing technical solution, the terminal obtains the second information. In addition, the second field is used or reused to indicate different information, so that overheads are reduced.

In an embodiment, the receiving second information includes: receiving the second information by using a system information block, radio resource control signaling, or downlink control information.

It may be learned that, in the foregoing technical solution, a manner of obtaining the second information is enriched.

According to a third aspect, this application provides a network device, including: a processing module, configured to determine OAM modes for at least two subframes of a radio frame, where at least one symbol is mapped to each subframe in the at least two subframes; and a transceiver module, configured to send the at least two subframes, where there is an association relationship between OAM modes corresponding to the subframes in the at least two subframes.

In an embodiment, the transceiver module is further configured to send first information, where the first information includes a first field and an initial OAM mode in a first OAM mode sequence, and the first field is used to indicate Δl, or the first field is reused to indicate Δl and a first subcarrier spacing.

In an embodiment, the transceiver module is further configured to send the first information by using a system information block, radio resource control signaling, or downlink control information.

In an embodiment, the processing module is further configured to obtain a frequency shift of an uplink reference signal; and the transceiver module is further configured to: if the frequency shift of the uplink reference signal is less than or equal to a first frequency shift, send a second OAM mode sequence, or an initial OAM mode in the second OAM mode sequence and a difference between adjacent OAM modes in the second OAM mode sequence, where the difference between the adjacent OAM modes in the second OAM mode sequence is less than a difference between adjacent OAM modes in the first OAM mode sequence; or if the frequency shift of the uplink reference signal is greater than the first frequency shift, send a third OAM mode sequence, or an initial OAM mode in the third OAM mode sequence and a difference between adjacent OAM modes in the third OAM mode sequence, where the difference between the adjacent OAM modes in the third OAM mode sequence is greater than the difference between the adjacent OAM modes in the first OAM mode, and the difference between the adjacent OAM modes in the third OAM mode sequence is greater than the difference between the adjacent OAM modes in the second OAM mode sequence.

In an embodiment, the transceiver module is configured to send second information, where the second information includes a second field and the initial OAM mode in the second OAM mode sequence, or the second information includes the second field and the initial OAM mode in the third OAM mode sequence, where the second field is used to indicate the difference between the adjacent OAM modes in the second OAM mode sequence or the difference between the adjacent OAM modes in the third OAM mode sequence, or the second field is reused to indicate the difference between the adjacent OAM modes in the second OAM mode sequence and a second subcarrier spacing, or the difference between the adjacent OAM modes in the third OAM mode sequence and a third subcarrier spacing.

In an embodiment, the transceiver module is configured to send the second information by using a system information block, radio resource control signaling, or downlink control information.

In a possible design, the network device may be a base station or an access point, or may be a chip in a base station or an access point. The network device has a function of a network device that includes a unit module for implementing a corresponding action in the communication method based on orbital angular momentum (OAM) disclosed in any one of the embodiments described herein.

In an embodiment, a structure of the network device includes at least one processor and a memory. The at least one processor is configured to support the network device in performing a corresponding function in the communication transmission method based on orbital angular momentum (OAM) disclosed in any one of the first aspect or the embodiments described herein. The memory is configured to be coupled to the at least one processor, and the memory stores a program (instructions) and data that are used for the network device. In some embodiments, the network device may further include a communication interface, configured to support communication between the network device and another network element.

In another embodiment, the network device includes at least one processor and a transceiver apparatus. The at least one processor is coupled to the transceiver apparatus, and the at least one processor is configured to execute a computer program or instructions to control the transceiver apparatus to receive and send information. When the at least one processor executes the computer program or the instructions, the at least one processor is further configured to implement the foregoing method. For example, the transceiver apparatus may be a transceiver, a transceiver circuit, or an input/output interface. When the network device is a chip, the transceiver apparatus is a transceiver circuit or an input/output interface.

When the network device is a chip, the receiving unit may be an input unit, for example, an input circuit or a communication interface; and the sending unit may be an output unit, for example, an output circuit or a communication interface. When the network device is a communication device, a receiving unit may be a receiver (or may be referred to as a receiver), and a sending unit may be a transmitter (or may be referred to as a transmitter).

It may be understood that, in this embodiment of this application, hardware parts that are in the network device and that are responsible for input and output may be integrated.

According to a fourth aspect, this application provides a terminal device, including: a transceiver module, configured to receive a radio frame, where the radio frame includes at least two subframes, at least one symbol is mapped to each subframe in the at least two subframes, and there is an association relationship between OAM modes corresponding to the subframes in the at least two subframes; and a processing module, configured to demodulate the radio frame based on the association relationship between the OAM modes corresponding to the subframes in the at least two subframes.

In an embodiment, the transceiver module is further configured to receive first information, where the first information includes a first field and an initial OAM mode in a first OAM mode sequence, and the first field is used to indicate Δl, or the first field is reused to indicate Δl and a first subcarrier spacing.

In an embodiment, the transceiver module is configured to receive the first information by using a system information block, radio resource control signaling, or downlink control information.

In an embodiment, the transceiver module is further configured to receive a second OAM mode sequence, or an initial OAM mode in the second OAM mode sequence and a difference between adjacent OAM modes in the second OAM mode sequence, where the difference between the adjacent OAM modes in the second OAM mode sequence is less than a difference between adjacent OAM modes in the first OAM mode sequence; or receive a third OAM mode sequence, or an initial OAM mode in the third OAM mode sequence and a difference between adjacent OAM modes in the third OAM mode sequence, where the difference between the adjacent OAM modes in the third OAM mode sequence is greater than the difference between the adjacent OAM modes in the first OAM mode, and the difference between the adjacent OAM modes in the third OAM mode sequence is greater than the difference between the adjacent OAM modes in the second OAM mode sequence.

In an embodiment, the transceiver module is further configured to receive second information, where the second information includes a second field and the initial OAM mode in the second OAM mode sequence, or the second information includes the second field and the initial OAM mode in the third OAM mode sequence, where the second field is used to indicate the difference between the adjacent OAM modes in the second OAM mode sequence or the difference between the adjacent OAM modes in the third OAM mode sequence, or the second field is reused to indicate the difference between the adjacent OAM modes in the second OAM mode sequence and a second subcarrier spacing, or the difference between the adjacent OAM modes in the third OAM mode sequence and a third subcarrier spacing.

In an embodiment, the transceiver module is configured to receive the second information by using a system information block, radio resource control signaling, or downlink control information.

In a possible design, the terminal device may be a chip (such as a baseband chip or a communication chip), and may implement the foregoing method by using software or hardware or by executing corresponding software by hardware.

In another embodiment, a structure of the terminal device includes a processor and a memory. The processor is configured to support the terminal device in performing a corresponding function in the communication transmission method based on orbital angular momentum (OAM) disclosed in any one of the first aspect or the embodiments described herein. The memory is configured to be coupled to the processor, and the memory stores a program (instructions) and/or data that are/is used for the terminal device. In some embodiments, the terminal device may further include a communication interface, configured to support communication between the terminal device and another network element.

In another embodiment, the terminal device may include a unit module for performing a corresponding function or action in the communication method based on orbital angular momentum (OAM) disclosed in any one of the second aspect or the embodiment described herein.

In still another embodiment, the terminal device includes at least one processor and a transceiver apparatus. The at least one processor is coupled to the transceiver apparatus, and the at least one processor is configured to execute a computer program or instructions to control the transceiver apparatus to receive and send information. When the at least one processor executes the computer program or the instructions, the at least one processor is further configured to implement the foregoing method. For example, the transceiver apparatus may be a transceiver, a transceiver circuit, or an input/output interface. When the terminal device is a chip, the transceiver apparatus is a transceiver circuit or an input/output interface.

When the terminal device is a chip, a sending unit may be an output unit such as an output circuit or a communication interface, and a receiving unit may be an input unit such as an input circuit or a communication interface. When the terminal device is a communication device, a sending unit may be a transmitter or a transmitter, and a receiving unit may be a receiver or a receiver.

According to a fifth aspect, this application provides a computer-readable storage medium. The computer-readable storage medium stores a computer program. When the program is executed by a processor, the method according to any one of the first aspect or the embodiments described herein.

According to a sixth aspect, this application provides a computer-readable storage medium. The computer-readable storage medium stores a computer program. When the program is executed by a processor, the method according to any one of the second aspect or the embodiments described herein.

According to a seventh aspect, a computer program product including instructions is provided. When the computer program product is run on a computer, the computer is enabled to perform the method according to the first aspect, the second aspect, or any embodiment thereof. The computer program product may be completely or partially stored in a storage medium encapsulated in a processor, or may be completely or partially stored in a storage medium encapsulated outside a processor.

According to an eighth aspect, a communication system is provided, including any one of the foregoing network devices and/or any one of the foregoing terminal devices.

BRIEF DESCRIPTION OF DRAWINGS

The following briefly describes the accompanying drawings required for describing embodiments or the conventional technology.

DESCRIPTION OF EMBODIMENTS

Figure 1:
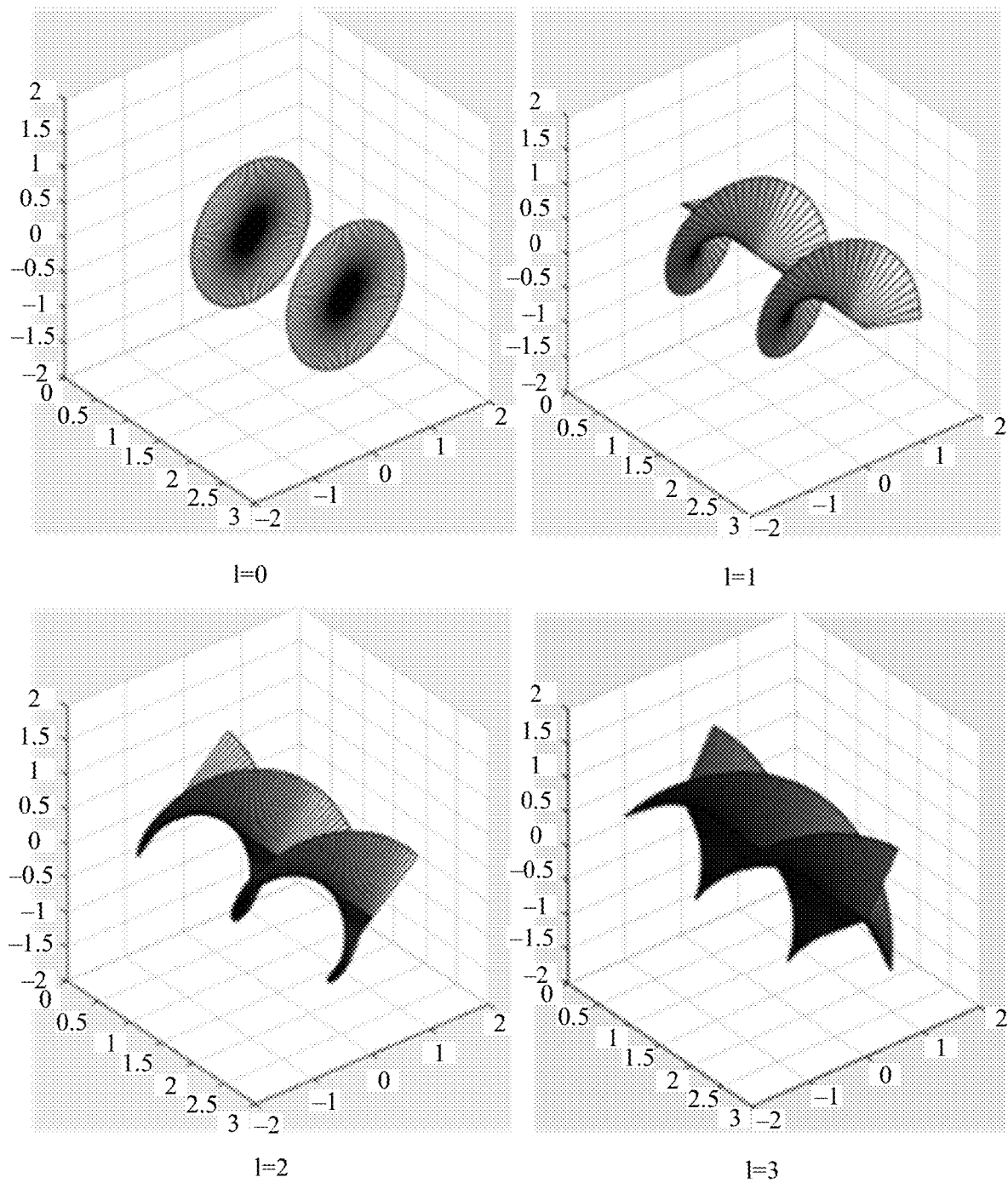
FIG. 1 is a schematic diagram of an electromagnetic wave with a helical non-planar wavefront structure according to an embodiment of this application.

The following describes the technical solutions in the embodiments of this application with reference to the accompanying drawings in the embodiments of this application.

In the specification, claims, and accompanying drawings of this application, terms "first", "second", and the like are intended to distinguish between different objects but do not indicate a particular order.

First, the technical solutions in the embodiments of this application may be applied to a long term evolution (LTE) architecture, or may be applied to a universal mobile telecommunication system (UMTS) terrestrial radio access network (UTRAN) architecture, a global system for mobile communication (GSM)/enhanced data rates for GSM evolution (EDGE) system radio access network (GERAN) architecture, a fifth mobile communication technology (5G), or the like. In the UTRAN architecture or the GERAN architecture, a function of a mobility management entity (MME) is implemented by a serving general packet radio service (GPRS) support node (SGSN), and a function of an SGW/PGW is implemented by a gateway GPRS support node (GGSN). The technical solutions in the embodiments of this application may be applied to another communication system such as a public land mobile network (PLMN) system or even a communication system following 5G. This is not limited in the embodiments of this application.

For ease of understanding of this application, related technological knowledge in the embodiments of this application is first described herein.

According to the classical electrodynamics theory, an electromagnetic wave has linear momentum in a propagation direction, and also has angular momentum perpendicular to the propagation direction. The angular momentum includes spin angular momentum (SAM) describing a polarization state and orbital angular momentum (OAM) describing a helical phase structure.

Generally, an electromagnetic wave that rotates in a beam propagation direction and whose wavefront has a helical phase structure may be obtained by adding a phase factor $e^{il\varphi}$ to a wireless electromagnetic wave with a planar wavefront structure. A wavefront (wave front) is a plane that is formed by mass points that start to be displaced at a moment and that exists when a wave propagates in a medium. Further, the electromagnetic wave that rotates in the beam propagation direction and whose wavefront has the helical phase structure may be represented as $U(r, \varphi)=A(r)e^{il\varphi}$, where $A(r)$ represents an amplitude of the electromagnetic wave, r represents a radiation distance to a beam center axis, $\varphi$ is an azimuth, l is an OAM mode of the electromagnetic wave, l is an unlimited integer, and l is a quantity of times that a helical wavefront of a light beam rotates by $2\pi$ radians when the light beam axially propagates one wavelength range. Electromagnetic waves of different OAM modes are orthogonal. Therefore, the electromagnetic waves of different OAM modes may be multiplexed to transmit information, and a capacity of a communication system is greatly improved by using orthogonality between OAM electromagnetic waves.

A spatial phase distribution structure of a helical beam depends on the helical phase factor $e^{il\varphi}$, and spatial structures of helical beams corresponding to different OAM modes are different. FIG. 1 is a schematic diagram of an electromagnetic wave with a helical non-planar wavefront structure according to an embodiment of this application. It may be learned that FIG. 1 is a schematic diagram in which an OAM mode l is 0, an OAM mode l is 1, an OAM mode l is 2, and an OAM mode l is 4. With the phase factor of the OAM mode l that is not 0, the electromagnetic wave has a helical non-planar wavefront structure.

Figure 2:
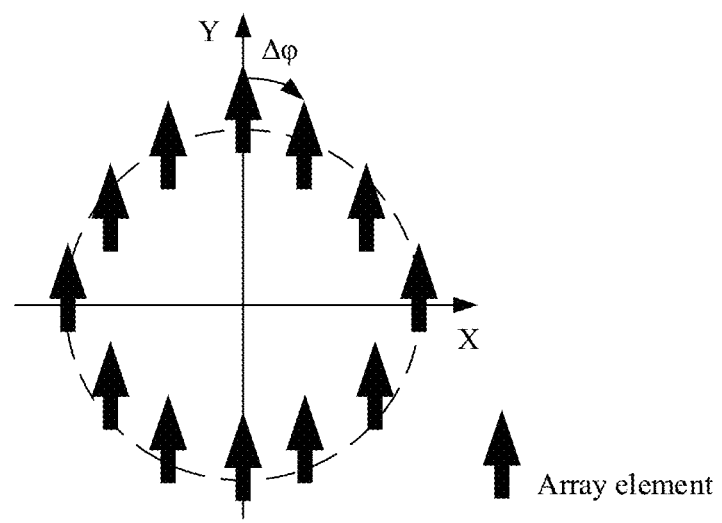
FIG. 2 is a schematic diagram of arranging array elements according to an embodiment of this application.

Further, an electromagnetic wave that carries OAM is generated by using N same array elements that are distributed on a circumference at equal intervals, and the array element is a dipole antenna. FIG. 2 is a schematic diagram of arranging array elements according to an embodiment of this application. As shown in FIG. 2, excitation feeding with an equal amplitude and a phase difference $$\Delta\varphi = \frac{2\pi l}{n}$$

is used for adjacent array elements, where l is an OAM mode, N is a quantity of array elements, and a maximum value of an OAM mode that can be generated depends on the quantity of array elements.

Generally, to improve a diversity effect and reduce an impact of multipath fading, a diversity technology is used during signal transmission. For example, a signal is mapped to a plurality of subframes of a radio frame (RF) for transmission. In this transmission manner, only a same signal is repeatedly sent, or only a same electromagnetic wave is repeatedly sent. Further, electromagnetic fields, wavelengths, frequencies, and the like of the electromagnetic waves are the same. However, during transmission, the electromagnetic waves do not interact with each other. As a result, the electromagnetic field is not enhanced, and signal fading is the same as signal fading existing when a single signal is transmitted. Therefore, in a conventional technology, a diversity effect is poor.

In view of this, the embodiments of this application proposes a communication method based on OAM, to resolve the foregoing problem. The following describes the embodiments of this application in detail.

Figure 3:
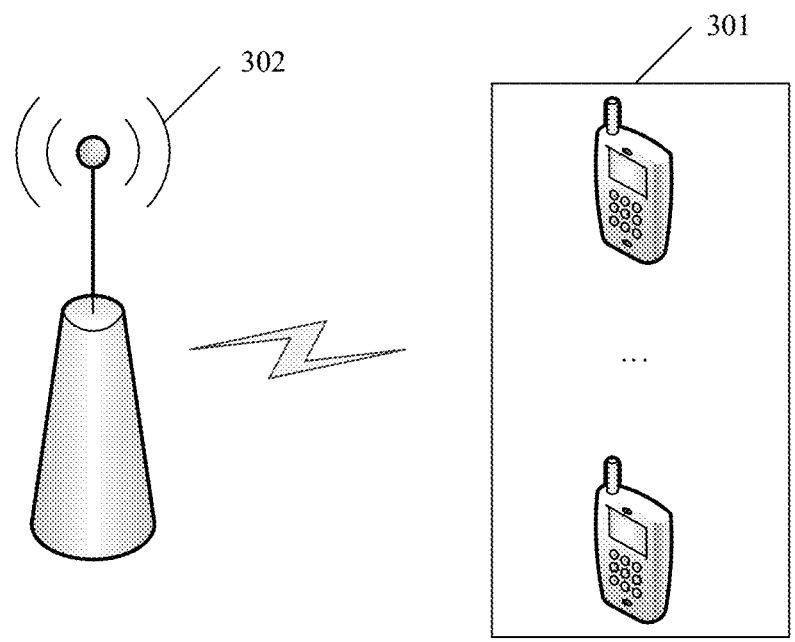
FIG. 3 is a schematic diagram of a network architecture according to an embodiment of this application.

FIG. 3 is a schematic diagram of a network architecture according to an embodiment of this application. As shown in FIG. 3, the network architecture may include a plurality of terminal devices 301 and a network device 302. Each terminal device in the plurality of terminal devices 301 may transmit uplink data to the network device 302, and the uplink data is transmitted to the network device 302 through channel coding and constellation modulation. The network device 302 may transmit downlink data to each terminal device in the plurality of terminal devices 301, and the downlink data is transmitted to any terminal device in the plurality of terminal devices 301 through channel coding and constellation modulation. Further, the network device 302 may transmit downlink data to the plurality of terminal devices 301 by using an electromagnetic wave that carries OAM.

The terminal device 301 may be a device that includes a wireless receiving/sending function and that may cooperate with the network device to provide a communication service for a user. Specifically, the terminal device may be user equipment (UE), an access terminal, a subscriber unit, a subscriber station, a mobile station, a mobile console, a remote station, a remote terminal, a mobile device, a terminal device, a terminal, a wireless communication device, a user agent, or a user apparatus. For example, the terminal device may be a cellular phone, a cordless phone, a session initiation protocol (SIP) phone, a wireless local loop (wireless local loop, WLL) station, a personal digital assistant (PDA), a handheld device having a wireless communication function, a computing device or another processing device connected to a wireless modem, a vehicle-mounted device, a wearable device, a terminal in a 5G network, a terminal in a future evolved PLMN, or the like. This is not limited in this embodiment of this application.

The network device 302 may be a device used to communicate with a user terminal. For example, the network device 302 may be a base transceiver station (BTS) in a GSM system or a CDMA system, or may be a NodeB (NB) in a wideband code division multiple access (WCDMA) system, or may be an evolved NodeB (eNB or eNodeB) in an LTE system, or may be a radio controller in a cloud radio access network (CRAN) scenario, or may be a new radio nodeB (gNB) in 5G. Alternatively, the network device 302 may be a relay station, an access point, a vehicle-mounted device, a wearable device, a network side device in a network following 5G, a network device in a future evolved PLMN network, or the like.

Figure 4:
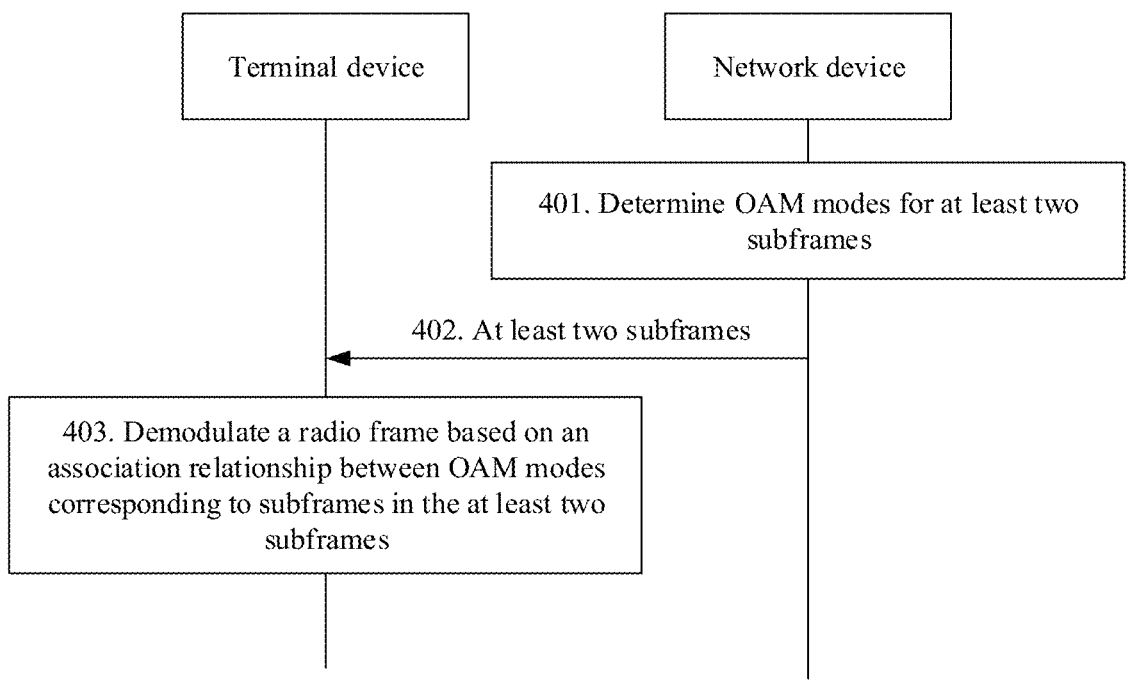
FIG. 4 is a schematic diagram of a communication method based on OAM according to an embodiment of this application.

FIG. 4 is a schematic diagram of a communication method based on OAM according to an embodiment of this application. A terminal device described in FIG. 4 may be any terminal device in the plurality of terminal devices 301 shown in FIG. 3, and a network device described in FIG. 4 may be the network device 302 shown in FIG. 3. As shown in FIG. 4, the method includes but is not limited to the following operations.

401. The network device determines OAM modes for at least two subframes of a radio frame.

At least one symbol is mapped to each subframe in the at least two subframes. Further, the at least one symbol may be at least one complex symbol of a first signal. The complex symbol is a modulation symbol that is modulated through QPSK. For example, a complex symbol is $$\frac{1}{\sqrt{2}} - j \cdot \frac{1}{\sqrt{2}},$$

and j is an imaginary unit.

Further, the first signal is a first bit sequence transmitted on a BCH. The first signal includes at least one of the following: a system frame number (SFN), a frequency channel number, a bandwidth, a frequency, and a quantity of OAM modes supported by a system. Further, the quantity of OAM modes supported in the system is used to indicate a quantity of OAM modes in an OAM mode sequence supported by the system. For example, the quantity of OAM modes supported by the system may be a quantity of OAM modes corresponding to a first OAM mode sequence.

Figure 5:
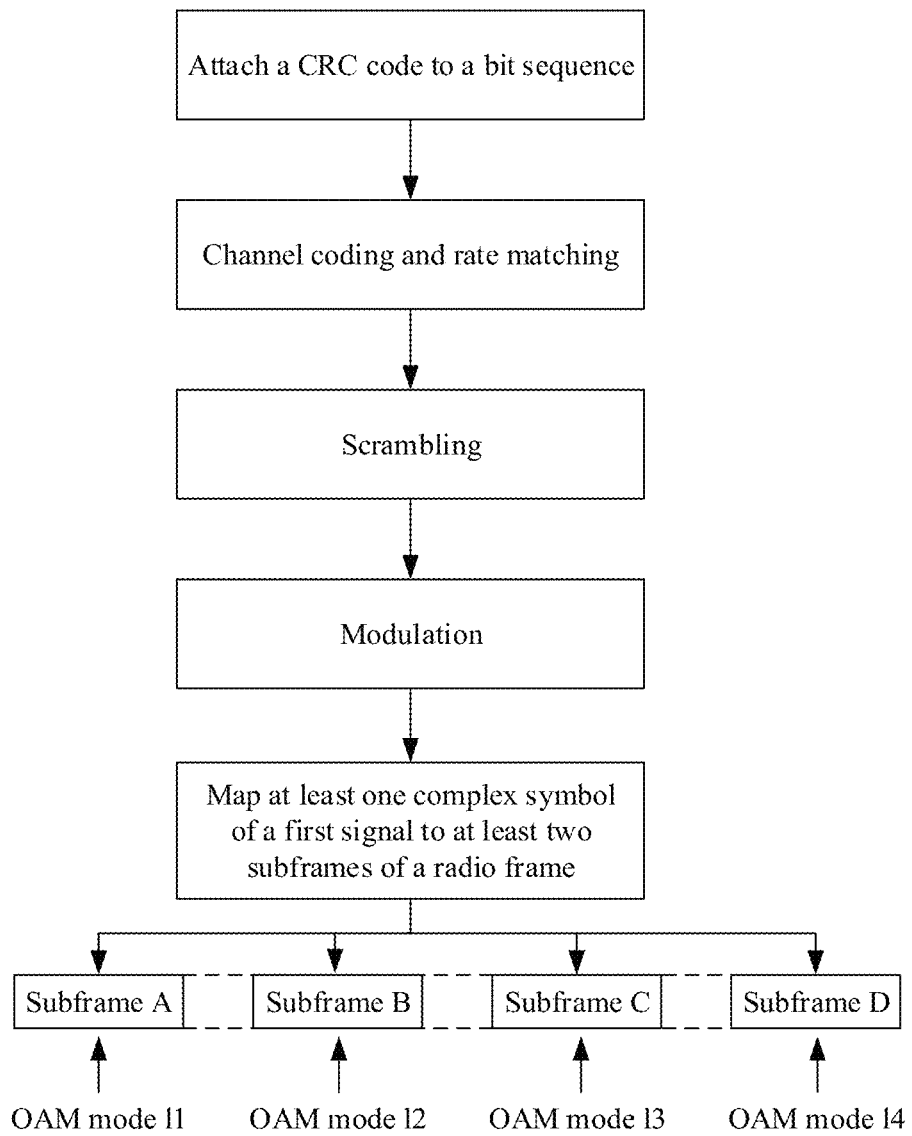
FIG. 5 is a schematic diagram of mapping a processed bit sequence to a radio frame according to an embodiment of this application.

Further, FIG. 5 is a schematic diagram of mapping a processed bit sequence to a radio frame according to an embodiment of this application. As shown in FIG. 5, it may be learned that the network device generates a cyclic redundancy check (CRC) code based on the first bit sequence. The network device attaches the CRC code to the first bit sequence, to obtain a second bit sequence. The network device performs channel coding on the second bit sequence to obtain a third bit sequence. Channel coding includes one of the following: convolutional coding, polar coding, or a low-density parity-check code. The network device performs rate matching on the third bit sequence to obtain a fourth bit sequence. The network device scrambles the fourth bit sequence by using a scrambling bit sequence, to obtain a fifth bit sequence. The scrambling bit sequence is generated based on a cell identifier, and the scrambling bit sequence varies with the cell identifier. For example, the fourth bit sequence is b(i) b(i) is b(0), b($M_{bit}$−1), and $M_{bit}$ is a bit quantity of the fourth bit sequence. The scrambling bit sequence is c(i), and the fifth bit sequence is $\tilde{b}$(i). In this case, the fifth bit sequence may be represented as $\tilde{b}$(i)=(b(i)+c(i))mod 2. Then, the network device modulates the fifth bit sequence to obtain the at least one complex symbol of the first signal. Further, the network device modulates the fifth bit sequence through QPSK. Specifically, for QPSK modulation, refer to Table 1.

TABLE 1

At least one complex symbol of a first signal provided in this embodiment of this application

| $\tilde{b}$ (i), $\tilde{b}$ (i + 1) | I | Q |
|---|---|---|
| 00 | $\frac{1}{\sqrt{2}}$ | $\frac{1}{\sqrt{2}}$ |
| 01 | $\frac{1}{\sqrt{2}}$ | $-\frac{1}{\sqrt{2}}$ |
| 10 | $-\frac{1}{\sqrt{2}}$ | $\frac{1}{\sqrt{2}}$ |
| 11 | $-\frac{1}{\sqrt{2}}$ | $-\frac{1}{\sqrt{2}}$ |

It may be learned that in Table 1, four complex symbols may be obtained when the group of bit sequences b(i) and b(i+1) has four combinations. For example, a complex symbol corresponding to bits "01" is $$\frac{1}{\sqrt{2}} - j \cdot \frac{1}{\sqrt{2}},$$

where j is an imaginary unit. For another example, a complex symbol corresponding to bits "11" is $$-\frac{1}{\sqrt{2}} - j \cdot \frac{1}{\sqrt{2}}.$$

Further, in table 1, I is a real part, and Q is an imaginary part. It may be understood that a complex symbol meets the following formula: x=I+j·Q, where x is the complex symbol.

Further, the network device maps the at least one complex symbol of the first signal to the at least two subframes of the radio frame. Referring to FIG. 5, it may be learned that the network device maps the at least one complex symbol of the first signal to four subframes of the radio frame, and further determines four different OAM modes for the four subframes. For example, a subframe A corresponds to an OAM mode 11, a subframe B corresponds to an OAM mode 12, a subframe C corresponds to an OAM mode 13, and a subframe D corresponds to an OAM mode 14.

Further, each subframe in the at least two subframes corresponds to a complex symbol of the first signal, and complex symbols corresponding to the subframes in the at least two subframes may be all the same, or may be partially the same, or may be different from each other. For example, if the at least two subframes include a subframe A, a subframe B, and a subframe C, Case 1 may be as follows: Complex symbols corresponding to the subframe A, the subframe B, and the subframe C are all $$\frac{1}{\sqrt{2}} - j \cdot \frac{1}{\sqrt{2}};$$

Case 2 may be as follows: A complex symbol corresponding to the subframe A is $$-\frac{1}{\sqrt{2}} - j \cdot \frac{1}{\sqrt{2}},$$

and complex symbols corresponding to the subframe B and the subframe C are $$\frac{1}{\sqrt{2}} - j \cdot \frac{1}{\sqrt{2}};$$

or Case 3 may be as follows: A complex symbol corresponding to the subframe A is $$-\frac{1}{\sqrt{2}} - j \cdot \frac{1}{\sqrt{2}},$$

a complex system corresponding to the subframe B is $$\frac{1}{\sqrt{2}} + j \cdot \frac{1}{\sqrt{2}},$$

and a complex symbol corresponding to the subframe C is $$\frac{1}{\sqrt{2}} - j \cdot \frac{1}{\sqrt{2}}.$$

Further, each symbol in the at least one symbol may further include one of the following: a PSS or an SSS. The PSS is used to perform downlink synchronization by the terminal device, and the SSS is used to perform cell search by the terminal device.

Figure 6:
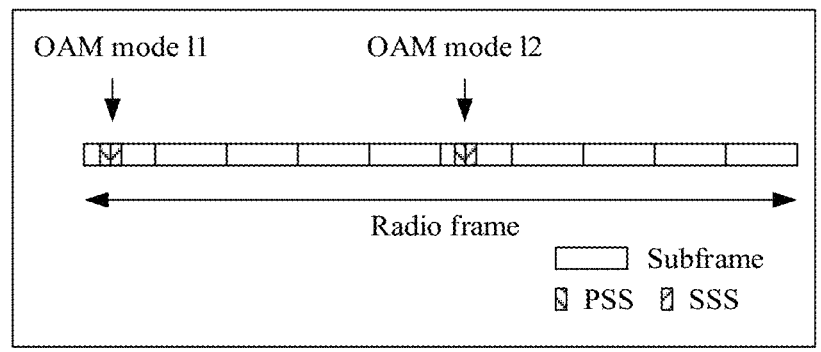
FIG. 6 is a schematic diagram of mapping a symbol to a radio frame according to an embodiment of this application.

Further, FIG. 6 is a schematic diagram of mapping a symbol to a radio frame according to an embodiment of this application. As shown in FIG. 6, it may be learned that a PSS and an SSS are mapped to each subframe in two subframes of the radio frame. In addition, the two subframes respectively correspond to an OAM mode 11 and an OAM mode 12. To be specific, a PSS and an SSS in a same subframe are transmitted by using a same OAM mode.

Further, each subframe in the at least two subframes corresponds to a PSS and an SSS, and PSSs and SSSs corresponding to the subframes in the at least two subframes are the same. For example, if the at least two subframes include a subframe A and a subframe B, the subframe A corresponds to a PSS and an SSS, and the subframe B corresponds to a PSS and an SSS. Further, the PSS corresponding to the subframe A is the same as the PSS corresponding to the subframe B, and the SSS corresponding to the subframe A is the same as the SSS corresponding to the subframe B.

It may be understood that the network device may not determine an OAM mode for another subframe, or may determine an OAM mode for another subframe. The another subframe is at least one subframe that is of the radio frame and to which a complex symbol of the first signal is not mapped, or the another subframe is at least one subframe that is of the radio frame and to which a PSS and an SSS are not mapped. This is not limited in this application. In addition, when determining the OAM mode for the another subframe, the network device may continue to use content in this application. This is not limited herein.

In some embodiments, in an embodiment, OAM modes corresponding to adjacent subframes in the at least two subframes are different.

The adjacent subframes include subframes whose sending times are adjacent to each other, and the sending time is a time for sending the subframe.

For example, the radio frame includes three subframes, and the three subframes are respectively a subframe A, a subframe B, and a subframe C. Further, it is assumed that a complex symbol of the first signal is mapped to each of the subframe A, the subframe B, and the subframe C. A sending time of the subframe A is 2019-11-07 14:32:05, a sending time of the subframe B is 2019-11-07 14:32:07, and a sending time of the subframe C is 2019-11-07 14:32:10. It may be learned that the sending time of the subframe A is earliest, and the subframe B is sent after the subframe A is sent. Therefore, the subframe A and the subframe B are adjacent subframes. The subframe C is sent after the subframe B is sent. Therefore, the subframe B and the subframe C are adjacent subframes. Further, the subframe A may correspond to an OAM mode 11, the subframe B may correspond to an OAM mode 12, and the subframe C may correspond to an OAM mode 11. Alternatively, the subframe A may correspond to an OAM mode −11, the subframe B may correspond to an OAM mode 12, and the subframe C may correspond to an OAM mode 13. OAM modes respectively corresponding to the subframe A, the subframe B, and the subframe C are not limited in this application.

It may be learned that the OAM modes corresponding to the adjacent subframes in the at least two subframes are different. Therefore, when the at least two subframes are sent, electromagnetic waves interact with each other, to enhance an electromagnetic field, reduce signal fading, and improve a diversity effect.

In some embodiments, in an embodiment, OAM modes corresponding to the subframes in the at least two subframes are different.

For example, the radio frame includes three subframes, and the three subframes are respectively a subframe A, a subframe B, and a subframe C. In this case, the subframe A may correspond to an OAM mode 11, the subframe B may correspond to an OAM mode 12, and the subframe C may correspond to an OAM mode 13.

It may be learned that the OAM modes corresponding to the subframes in the at least two subframes are different. Therefore, when the at least two subframes are sent, electromagnetic waves interact with each other, to enhance an electromagnetic field, reduce signal fading, and improve a diversity effect.

It may be understood that the radio frame includes a first subframe, a second subframe, a third subframe, and a fourth subframe. The first subframe and the second subframe are adjacent subframes. The second subframe and the third subframe are adjacent subframes. The third subframe and the fourth subframe are adjacent subframes. In an embodiment, there is an association relationship between an OAM mode corresponding to the first subframe and each of an OAM mode corresponding to the second subframe, an OAM mode corresponding to the third subframe, and an OAM mode corresponding to the fourth subframe. For example, the OAM mode corresponding to the first subframe is 11, the OAM mode corresponding to the second subframe is 11+Δl, the OAM mode corresponding to the third subframe is l1+2Δl, and the OAM mode corresponding to the fourth subframe is l1+3Δl, where Δl is a difference between adjacent OAM modes in an OAM mode sequence supported by the system. In another embodiment, there is an association relationship between an OAM mode corresponding to the third subframe and an OAM mode corresponding to the first subframe, and there is an association relationship between an OAM mode corresponding to the fourth subframe and an OAM mode corresponding to the second subframe. For example, the OAM mode corresponding to the first subframe is l1, the OAM mode corresponding to the second subframe is l2, the OAM mode corresponding to the third subframe is l1+2Δl, and the OAM mode corresponding to the fourth subframe is −l2.

In some embodiments, in an embodiment, the OAM mode corresponding to each subframe in the at least two subframes meets the following formula: (ml+nΔl), where both m and n are integers, l is an OAM mode in a first OAM mode sequence, and when a quantity of OAM modes corresponding to the first OAM mode sequence is 1, Δl is 0, or when a quantity of OAM modes corresponding to the first OAM mode sequence is greater than or equal to 2, Δl is a difference between adjacent OAM modes in the first OAM mode sequence.

For example, an OAM mode corresponding to a subframe A of the radio frame may be l, 2l, (5l+Δl), or (5l−2Δl).

The quantity of OAM modes corresponding to the first OAM mode sequence is a quantity of OAM modes in the first OAM mode sequence.

The first OAM mode sequence is an OAM mode sequence supported by the system.

For example, if the first OAM mode sequence is {2}, the quantity of OAM modes corresponding to the first OAM mode sequence is 1. Further, the OAM mode corresponding to the subframe A of the radio frame may be 2 or 3×2, namely, 6. For another example, if the first OAM mode sequence is {1, 2, 3, 4}, the quantity of OAM modes corresponding to the first OAM mode sequence is 4, and the difference between the adjacent OAM modes in the first OAM mode sequence is 1. Further, the OAM mode corresponding to the subframe A of the radio frame may be any OAM mode in the first OAM mode sequence. The OAM mode corresponding to the subframe A may be 3×2, namely, 6. The OAM mode corresponding to the subframe A may be 3×2+2×1, namely, 8. The OAM mode corresponding to the subframe A may be 2×2−5×1, namely, −1.

It may be learned that, in the foregoing technical solution, the OAM mode corresponding to each subframe in the at least two subframes meets the foregoing formula, so that a manner of determining the OAM mode corresponding to each subframe is enriched.

In some embodiments, in an embodiment, the first OAM mode sequence includes k OAM modes, and when k is 1, each OAM mode in the k OAM modes is a non-zero integer, or when k is greater than or equal to 2, each OAM mode in the k OAM modes is a non-zero integer, and the k OAM modes are different from each other.

For example, if the first OAM mode sequence includes one OAM mode, the first OAM mode sequence may be {2} or {−8}. If the first OAM mode sequence includes three OAM modes, the first OAM mode sequence may be {1, 2, 3}, {−1, 1, 2}, or {−6, −4, −2}.

It may be learned that, in the foregoing technical solution, an OAM mode included in the first OAM mode sequence is determined based on different quantities of OAM modes included in the first OAM mode sequence, to prepare for subsequent improvement of a diversity effect.

In an embodiment, when k is an even number greater than or equal to 2, the first OAM mode sequence includes $$\frac{k}{2}$$

pairs of OAM modes; or when k is an odd number greater than 2, the first OAM mode sequence includes $$\frac{k-1}{2}$$

pairs of OAM modes, where each pair of OAM modes in the $$\frac{k}{2}$$

pairs of OAM modes and the $$\frac{k-1}{2}$$

pairs of OAM modes has opposite wavefront phases.

For example, when k is 2, the first OAM mode sequence may be {−1, 1}, where 1 and −1 are a pair of OAM modes, and 1 and −1 have opposite wavefront phases. When k is 3, the first OAM mode sequence may be {−2, 2, 4}, where 2 and −2 are a pair of OAM modes, and 2 and −2 have opposite wavefront phases.

It may be understood that OAM modes corresponding to opposite wavefront phases may be configured by the network device or may be preset. For example, when k is 2, the first OAM mode sequence may be {−1, 5}, where 5 and −1 are a pair of OAM modes, and 5 and −1 have opposite wavefront phases. In other words, the network device may configure any two different OAM modes as a pair of OAM modes having opposite wavefront phases. Further, the network device may configure, as a pair of OAM modes having opposite wavefront phases, any two OAM modes that are opposite numbers of each other.

It may be learned that, in the foregoing technical solution, a quantity of pairs of OAM modes included in the first OAM mode sequence is determined based on different quantities of OAM modes included in the first OAM mode sequence, and it is determined that each pair of OAM modes has opposite wavefront phases, to prepare for subsequent improvement of a diversity effect.

402. The network device sends the at least two subframes.

Correspondingly, the terminal device receives a radio frame that includes the foregoing at least two subframes. At least one symbol is mapped to each subframe in the at least two subframes, and there is an association relationship between the OAM modes corresponding to the subframes in the at least two subframes.

403. The terminal device demodulates the radio frame based on the association relationship between the OAM modes corresponding to the subframes in the at least two subframes.

It may be understood that the terminal device may obtain at least one symbol by demodulating the radio frame. Further, when obtaining a PSS and an SSS, the terminal device may perform downlink synchronization by using the PSS, and perform cell search by using the SSS. Further, when obtaining the at least one complex symbol of the first signal, the terminal may perform random access based on the at least one complex symbol of the first signal, to complete uplink synchronization and establish a radio resource control (RRC) connection to the network device.

It may be learned that, in the foregoing technical solution, the OAM modes are determined for the at least two subframes, and there is an association relationship between the OAM modes corresponding to the subframes in the at least two subframes. Therefore, in a process of sending the at least two subframes, electromagnetic waves interact with each other, to enhance an electromagnetic field, reduce signal fading, and improve a diversity effect.

Figure 7:
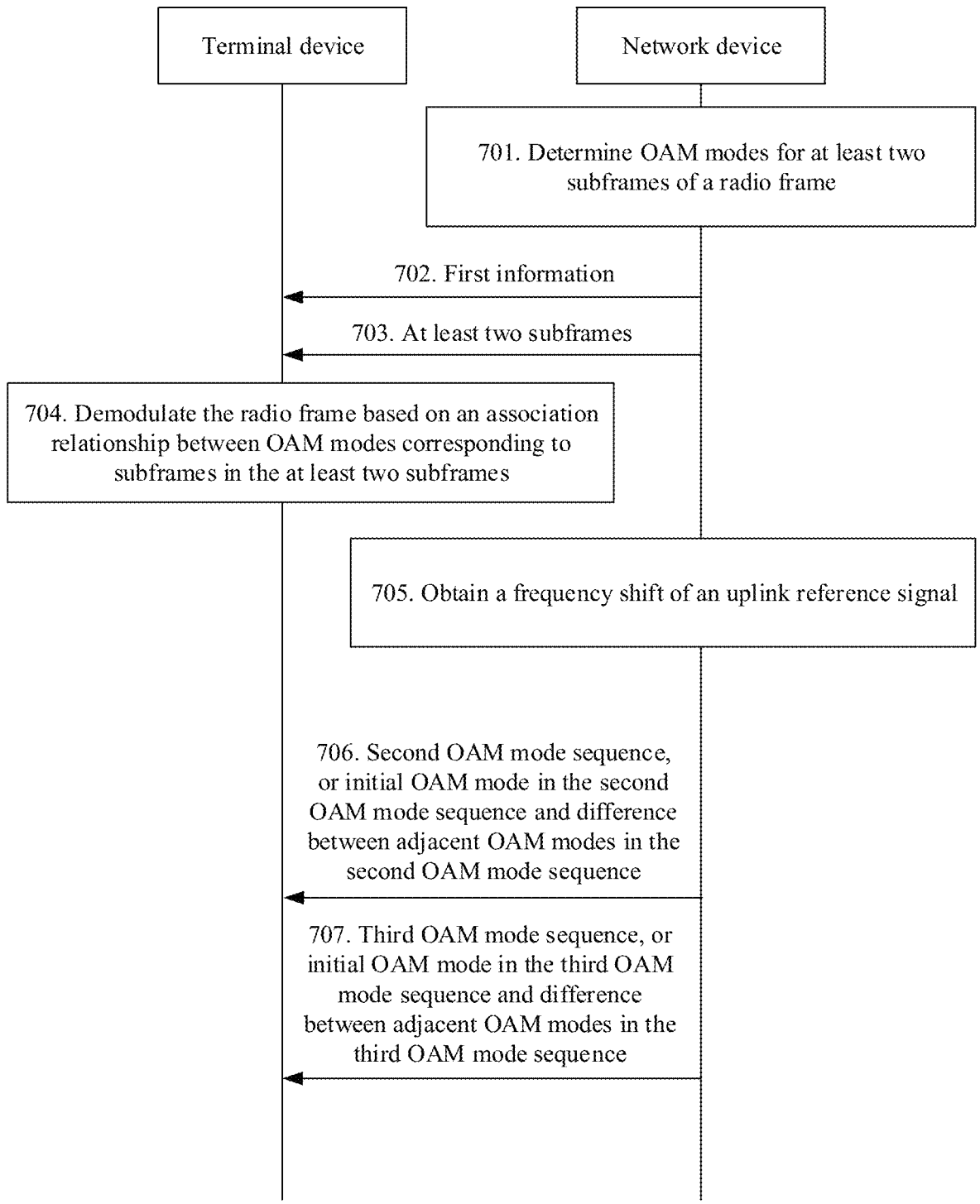
FIG. 7 is a schematic diagram of another communication method based on OAM according to an embodiment of this application.

FIG. 7 is a schematic diagram of another communication method based on OAM according to an embodiment of this application. A terminal device described in FIG. 7 may be any terminal device in the plurality of terminal devices 301 shown in FIG. 3, and a network device described in FIG. 4 may be the network device 302 shown in FIG. 3. As shown in FIG. 7, the method includes but is not limited to the following operations:

701. The network device determines OAM modes for at least two subframes of a radio frame.

For details, refer to operation 401 in the embodiment shown in FIG. 4. Details are not described herein again.

702. The network device sends first information.

The first information includes a first field and an initial OAM mode in a first OAM mode sequence. The first field is used to indicate $\Delta l$, or the first field is reused to indicate $\Delta l$ and a first subcarrier spacing.

For example, for details, refer to Table 2.

TABLE 2

| First field provided in this embodiment of this application indicates $\Delta l$ | |
|---|---|
| First field | $\Delta l$ |
| 00 | 1 |
| 01 | 2 |
| 10 | 4 |
| 11 | 8 |

It may be learned that in Table 2, two bits, namely, (00, 01, 10, 11), are respectively used to indicate different $\Delta l$. For example, 00 indicate that $\Delta l$ is 1, and 11 indicate that $\Delta l$ is 8.

For another example, for details, refer to Table 3.

TABLE 3

| First field provided in this embodiment of this application indicates $\Delta l$ and a subcarrier spacing | | |
|---|---|---|
| First field | $\Delta l$ | Subcarrier spacing (khz) |
| 00 | 1 | 15 |
| 01 | 2 | 30 |
| 10 | 4 | 60 |
| 11 | 8 | 120 |

It may be learned that in Table 3, two bits, namely, (00, 01, 10, 11), are respectively reused to indicate different $\Delta l$ and different subcarrier spacings. For example, 00 indicate that $\Delta l$ is 1, and also indicate that the subcarrier spacing is 15 kHz; and 11 indicate that $\Delta l$ is 8, and also indicate that the subcarrier spacing is 120 kHz.

It may be understood that the terminal device receives the first information, and the first information includes the first field and the initial OAM mode in the first OAM mode sequence. The first field is used to indicate $\Delta l$, or the first field is reused to indicate $\Delta l$ and the first subcarrier spacing.

It may be learned that, in the foregoing technical solution, the terminal obtains the first information. In addition, the first field is used to indicate $\Delta l$ or is reused to indicate $\Delta l$ and the first subcarrier spacing, so that overheads are reduced.

In some embodiments, for the network device, in an embodiment, the sending first information includes: sending the first information by using a system information block, radio resource control signaling, or downlink control information.

It may be learned that, in the foregoing technical solution, a manner of sending the first information is enriched.

It may be understood that, for the terminal device, in an embodiment, the receiving the first information includes: receiving the first information by using a system information block, radio resource control signaling, or downlink control information.

It may be learned that, in the foregoing technical solution, a manner of obtaining the first information is enriched.

Operation 702 may occur before operation 701.

703. The network device sends the at least two subframes.

Correspondingly, the terminal device receives a radio frame that includes the foregoing at least two subframes.

For details, refer to operation 402 in the embodiment shown in FIG. 4. Details are not described herein again.

704. The terminal device demodulates the radio frame based on an association relationship between OAM modes corresponding to subframes in the at least two subframes.

For details, refer to operation 403 in the embodiment shown in FIG. 4. Details are not described herein again.

705. The network device obtains a frequency shift of an uplink reference signal.

The uplink reference signal includes a DMRS and/or an SRS.

If the frequency shift of the uplink reference signal is less than or equal to a first frequency shift, operation 706 is performed. If the frequency shift of the uplink reference signal is greater than the first frequency shift, operation 707 is performed. The first frequency shift is configured by the network device or is preset.

Further, if the frequency shift of the uplink reference signal is equal to the first frequency shift, operation 706 may be performed, or operation 707 may be performed. It may be understood that, if the frequency shift of the uplink reference signal is equal to the first frequency shift, the network device may preferably send a second OAM mode sequence, or an initial OAM mode in the second OAM mode sequence and a difference between adjacent OAM modes in the second OAM mode sequence; or the network device may preferably send a third OAM mode sequence, or an initial OAM mode in the third OAM mode sequence and a difference between adjacent OAM modes in the third OAM mode sequence. A specific priority is not limited in this application.

The difference between the adjacent OAM modes in the second OAM mode sequence is less than a difference between adjacent OAM modes in the first OAM mode sequence.

The difference between the adjacent OAM modes in the third OAM mode sequence is greater than the difference between the adjacent OAM modes in the first OAM mode, and the difference between the adjacent OAM modes in the third OAM mode sequence is greater than the difference between the adjacent OAM modes in the second OAM mode sequence.

706. The network device sends the second OAM mode sequence, or the initial OAM mode in the second OAM mode sequence and the difference between the adjacent OAM modes in the second OAM mode sequence.

For example, if the second OAM mode sequence is {2}, the network device sends {2}. If the second OAM mode sequence is {1, 3, 5, 7}, the network device may send {1, 3, 5, 7}, or may send 1 and 2, where 1 is the initial OAM mode in the second OAM mode sequence, and 2 is the difference between the adjacent OAM modes in the second OAM mode sequence.

Correspondingly, the terminal device receives the second OAM mode sequence, or the initial OAM mode in the second OAM mode sequence and the difference between the adjacent OAM modes in the second OAM mode sequence.

For example, the terminal device may receive the second OAM mode sequence. For example, the second OAM mode sequence is {2}. For example, the second OAM mode sequence is {1, 3, 5, 7}. The terminal device may receive the initial OAM mode in the second OAM mode sequence and the difference between the adjacent OAM modes in the second OAM mode sequence. For example, the initial OAM mode in the second OAM mode sequence is 1, and the difference between the adjacent OAM modes in the second OAM mode sequence is 2.

707. The network device sends the third OAM mode sequence, or the initial OAM mode in the third OAM mode sequence and the difference between the adjacent OAM modes in the third OAM mode sequence.

For example, if the third OAM mode sequence is {2}, the network device sends {2}. If the third OAM mode sequence is {1, 3, 5, 7}, the network device may send {1, 3, 5, 7}, or may send 1 and 2, where 1 is the initial OAM mode in the third OAM mode sequence, and 2 is the difference between the adjacent OAM modes in the third OAM mode sequence.

Correspondingly, the terminal device receives the third OAM mode sequence, or the initial OAM mode in the third OAM mode sequence and the difference between the adjacent OAM modes in the third OAM mode sequence.

For example, the terminal device may receive the third OAM mode sequence. For example, the third OAM mode sequence is {2}. For example, the third OAM mode sequence is {1, 3, 5, 7}. The terminal device may receive the initial OAM mode in the third OAM mode sequence and the difference between the adjacent OAM modes in the third OAM mode sequence. For example, the initial OAM mode in the third OAM mode sequence is 1, and the difference between the adjacent OAM modes in the third OAM mode sequence is 2.

It may be learned that, in the foregoing technical solution, the OAM modes are determined for the at least two subframes, and there is an association relationship between the OAM modes corresponding to the subframes in the at least two subframes. Therefore, in a process of sending the at least two subframes, electromagnetic waves interact with each other, to enhance an electromagnetic field, reduce signal fading, and improve a diversity effect. Further, the terminal further obtains the first information. In addition, the first field is used to indicate $\Delta l$ or is reused to indicate $\Delta l$ and the first subcarrier spacing, so that overheads are reduced. In addition, signal transmission reliability is further improved.

In some embodiments, for the network device, in an embodiment, the method further includes: sending second information, where the second information includes a second field and the initial OAM mode in the second OAM mode sequence, or the second information includes the second field and the initial OAM mode in the third OAM mode sequence, where the second field is used to indicate the difference between the adjacent OAM modes in the second OAM mode sequence or the difference between the adjacent OAM modes in the third OAM mode sequence, or the second field is reused to indicate the difference between the adjacent OAM modes in the second OAM mode sequence and a second subcarrier spacing, or the difference between the adjacent OAM modes in the third OAM mode sequence and a third subcarrier spacing.

For example, if the second OAM mode sequence is {2}, the second information is the second field. If the second OAM mode sequence is {1, 3, 5, 7}, the second information includes the second field and the initial OAM mode in the second OAM mode sequence. Further, 1 is the initial OAM mode in the second OAM mode sequence. The second field is used to indicate the difference, namely, 2, between the adjacent OAM modes in the second OAM mode sequence. It is assumed that the second subcarrier spacing is 15 kilohertz kHz. In this case, the second field is reused to indicate the difference between the adjacent OAM modes in the second OAM mode sequence and the second subcarrier spacing, namely, 2 and 15 kHz.

For another example, if the third OAM mode sequence is {2}, the second information is the second field. If the third OAM mode sequence is {1, 3, 5, 7}, the second information includes the second field and the initial OAM mode in the third OAM mode sequence. Further, 1 is the initial OAM mode in the third OAM mode sequence. The second field is used to indicate the difference, namely, 2, between the adjacent OAM modes in the third OAM mode sequence. It is assumed that the third subcarrier spacing is 15 kHz. In this case, the second field is reused to indicate the difference between the adjacent OAM modes in the third OAM mode sequence and the third subcarrier spacing, namely, 2 and 15 kHz.

Correspondingly, the terminal device receives the second information.

Further, the network device may send the second information by using a system information block, radio resource control signaling, or downlink control information.

Correspondingly, the terminal device may receive the second information by using a system information block, radio resource control signaling, or downlink control information.

It may be learned that, in the foregoing technical solution, the terminal obtains the second information. In addition, the second field is used or reused to indicate different information, so that overheads are reduced. In addition, a manner of obtaining the second information is enriched.

Figure 8:
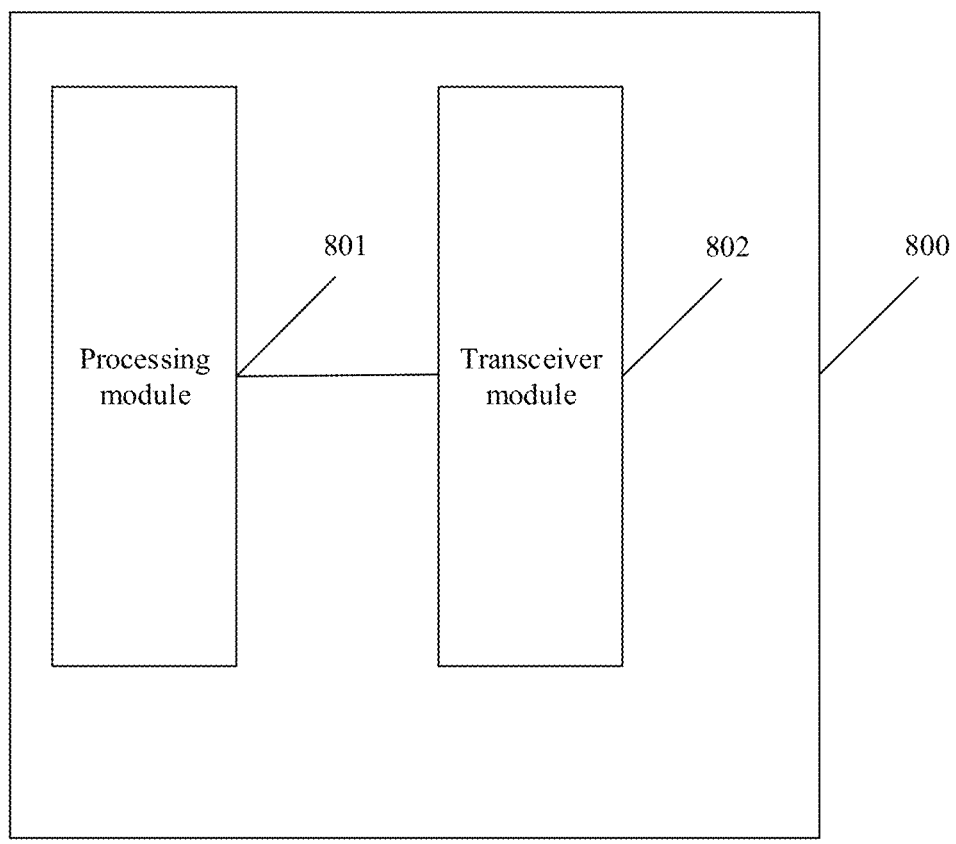
FIG. 8 shows a network device according to an embodiment of this application.

Based on a same concept of the foregoing communication method based on OAM, as shown in FIG. 8, an embodiment of this application further provides a network device. A network device 800 may be applied to the foregoing methods shown in FIG. 4 to FIG. 7. As shown in FIG. 8, the network device 800 includes a processing module 801 and a transceiver module 802.

The processing module 801 is configured to determine OAM modes for at least two subframes of a radio frame, where at least one symbol is mapped to each subframe in the at least two subframes. The transceiver module 802 is configured to send the at least two subframes, where there is an association relationship between OAM modes corresponding to the subframes in the at least two subframes.

In an embodiment, OAM modes corresponding to adjacent subframes in the at least two subframes are different.

In an embodiment, the OAM modes corresponding to the subframes in the at least two subframes are different.

In an embodiment, the OAM mode corresponding to each subframe in the at least two subframes meets the following formula: (ml+nΔl), where both m and n are integers, l is an OAM mode in a first OAM mode sequence, and when a quantity of OAM modes corresponding to the first OAM mode sequence is 1, Δl is 0, or when a quantity of OAM modes corresponding to the first OAM mode sequence is greater than or equal to 2, Δl is a difference between adjacent OAM modes in the first OAM mode sequence.

In an embodiment, the first OAM mode sequence includes k OAM modes, and when k is 1, each OAM mode in the k OAM modes is a non-zero integer, or when k is greater than or equal to 2, each OAM mode in the k OAM modes is a non-zero integer, and the k OAM modes are different from each other.

In an embodiment, when k is an even number greater than or equal to 2, the first OAM mode sequence includes $$\frac{k}{2}$$

pairs of OAM modes; or when k is an odd number greater than 2, the first OAM mode sequence includes $$\frac{k-1}{2}$$

pairs of OAM modes, where each pair of OAM modes in the $$\frac{k}{2}$$

pairs of OAM modes and the $$\frac{k-1}{2}$$

pairs or OAM modes has opposite wavefront phases.

In an embodiment, the transceiver module 802 is further configured to send first information, where the first information includes a first field and an initial OAM mode in the first OAM mode sequence, and the first field is used to indicate Δl, or the first field is reused to indicate Δl and a first subcarrier spacing.

In an embodiment, the transceiver module 802 is further configured to send the first information by using a system information block, radio resource control signaling, or downlink control information.

In an embodiment, the processing module 801 is further configured to obtain a frequency shift of an uplink reference signal. The transceiver module 802 is further configured to: if the frequency shift of the uplink reference signal is less than or equal to a first frequency shift, send a second OAM mode sequence, or an initial OAM mode in the second OAM mode sequence and a difference between adjacent OAM modes in the second OAM mode sequence, where the difference between the adjacent OAM modes in the second OAM mode sequence is less than the difference between the adjacent OAM modes in the first OAM mode sequence; or if the frequency shift of the uplink reference signal is greater than the first frequency shift, send a third OAM mode sequence, or an initial OAM mode in the third OAM mode sequence and a difference between adjacent OAM modes in the third OAM mode sequence, where the difference between the adjacent OAM modes in the third OAM mode sequence is greater than the difference between the adjacent OAM modes in the first OAM mode, and the difference between the adjacent OAM modes in the third OAM mode sequence is greater than the difference between the adjacent OAM modes in the second OAM mode sequence.

In an embodiment, the transceiver module 802 is configured to send second information, where the second information includes a second field and the initial OAM mode in the second OAM mode sequence, or the second information includes the second field and the initial OAM mode in the third OAM mode sequence, where the second field is used to indicate the difference between the adjacent OAM modes in the second OAM mode sequence or the difference between the adjacent OAM modes in the third OAM mode sequence, or the second field is reused to indicate the difference between the adjacent OAM modes in the second OAM mode sequence and a second subcarrier spacing, or the difference between the adjacent OAM modes in the third OAM mode sequence and a third subcarrier spacing.

In an embodiment, the transceiver module 802 is configured to send the second information by using a system information block, radio resource control signaling, or downlink control information.

For specific function implementation of the processing module 801 and the transceiver module 802, refer to related descriptions of the network device in the methods shown in FIG. 4 to FIG. 7.

Figure 9:
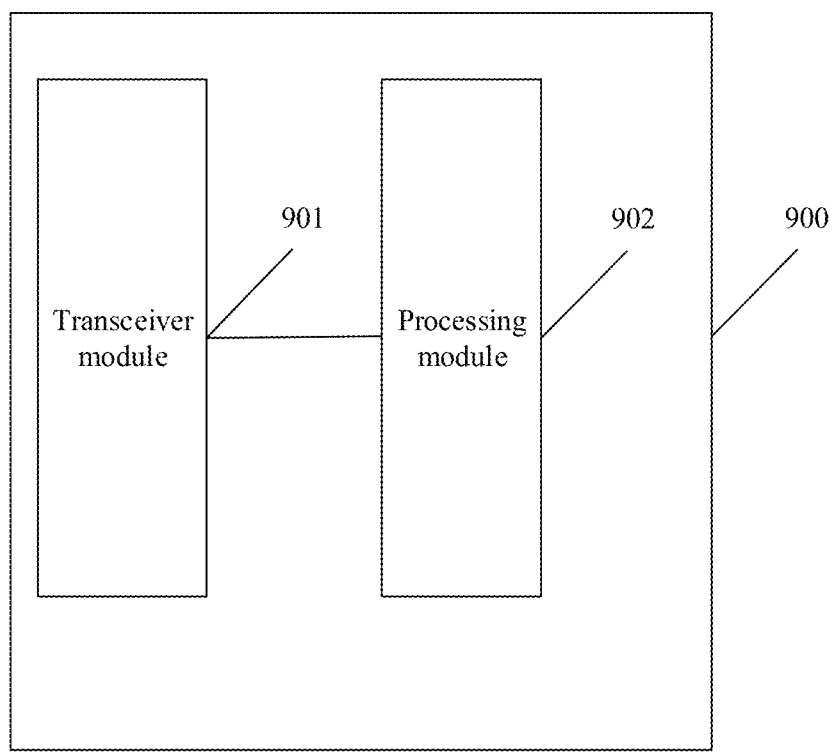
FIG. 9 shows a terminal device according to an embodiment of this application.

Based on a same concept of the foregoing communication method based on OAM, as shown in FIG. 9, an embodiment of this application further provides a terminal device. A terminal device 900 may be applied to the foregoing methods shown in FIG. 4 to FIG. 7. As shown in FIG. 9, the terminal device 900 includes a transceiver module 901 and a processing module 902.

The transceiver module 901 is configured to receive a radio frame, where the radio frame includes at least two subframes, at least one symbol is mapped to each subframe in the at least two subframes, and there is an association relationship between OAM modes corresponding to the subframes in the at least two subframes. The processing module 902 is configured to demodulate the radio frame based on the association relationship between the OAM modes corresponding to the subframes in the at least two subframes.

In an embodiment, OAM modes corresponding to adjacent subframes in the at least two subframes are different.

In an embodiment, the OAM modes corresponding to the subframes in the at least two subframes are different.

In an embodiment, the OAM mode corresponding to each subframe in the at least two subframes meets the following formula: (ml+nΔl), where both m and n are integers, l is an OAM mode in a first OAM mode sequence, and when a quantity of OAM modes corresponding to the first OAM mode sequence is 1, Δl is 0, or when a quantity of OAM modes corresponding to the first OAM mode sequence is greater than or equal to 2, Δl is a difference between adjacent OAM modes in the first OAM mode sequence.

In an embodiment, the first OAM mode sequence includes k OAM modes, and when k is 1, each OAM mode in the k OAM modes is a non-zero integer, or when k is greater than or equal to 2, each OAM mode in the k OAM modes is a non-zero integer, and the k OAM modes are different from each other.

In an embodiment, when k is an even number greater than or equal to 2, the first OAM mode sequence includes $$\frac{k}{2}$$

pairs or OAM modes; or when k is an odd number greater than 2, the first OAM mode sequence includes $$\frac{k-1}{2}$$

pairs or OAM modes, where each pair of OAM modes in the $$\frac{k}{2}$$

pairs or OAM modes and the $$\frac{k-1}{2}$$

pairs of OAM modes has opposite wavefront phases.

In an embodiment, the transceiver module 901 is further configured to receive first information, where the first information includes a first field and an initial OAM mode in the first OAM mode sequence, and the first field is used to indicate Δl, or the first field is reused to indicate Δl and a first subcarrier spacing.

In an embodiment, the transceiver module 901 is configured to receive the first information by using a system information block, radio resource control signaling, or downlink control information.

In an embodiment, the transceiver module 901 is further configured to receive a second OAM mode sequence, or an initial OAM mode in the second OAM mode sequence and a difference between adjacent OAM modes in the second OAM mode sequence, where the difference between the adjacent OAM modes in the second OAM mode sequence is less than the difference between the adjacent OAM modes in the first OAM mode sequence; or receive a third OAM mode sequence, or an initial OAM mode in the third OAM mode sequence and a difference between adjacent OAM modes in the third OAM mode sequence, where the difference between the adjacent OAM modes in the third OAM mode sequence is greater than the difference between the adjacent OAM modes in the first OAM mode, and the difference between the adjacent OAM modes in the third OAM mode sequence is greater than the difference between the adjacent OAM modes in the second OAM mode sequence.

In an embodiment, the transceiver module 901 is further configured to receive second information, where the second information includes a second field and the initial OAM mode in the second OAM mode sequence, or the second information includes the second field and the initial OAM mode in the third OAM mode sequence, where the second field is used to indicate the difference between the adjacent OAM modes in the second OAM mode sequence or the difference between the adjacent OAM modes in the third OAM mode sequence, or the second field is reused to indicate the difference between the adjacent OAM modes in the second OAM mode sequence and a second subcarrier spacing, or the difference between the adjacent OAM modes in the third OAM mode sequence and a third subcarrier spacing.

In an embodiment, the transceiver module 901 is configured to receive the second information by using a system information block, radio resource control signaling, or downlink control information.

For specific function implementation of the transceiver module 901 and the processing module 902, refer to related descriptions of the terminal device in the methods shown in FIG. 4 to FIG. 7.

An embodiment of this application further provides a terminal device/network device, and the terminal device/network device is configured to perform the foregoing communication method based on OAM. The foregoing communication method may be partially or all implemented by using hardware, or may be implemented by using software.

In some embodiments, the terminal device/network device may be a chip or an integrated circuit in specific implementation.

In some embodiments, when the communication method based on OAM in the foregoing embodiments is partially or all implemented by using software, the terminal device/network device includes: at least one processor, configured to execute a program. When the program is executed, the terminal device/network device may implement the communication method based on OAM provided in the foregoing embodiments. The terminal device/network device may further include a memory, configured to store a program. The related program may be loaded into the memory at delivery of the terminal device/network device, or may be loaded into the memory when required subsequently.

In some embodiments, the memory may be a physically independent unit, or may be integrated with the processor.

In some embodiments, when the communication method based on OAM in the foregoing embodiments is partially or all implemented by using software, the terminal device/network device may include only at least one processor. The memory configured to store the program is located outside the terminal device/network device. The processor is connected to the memory by using a circuit/wire, and is configured to read and execute the program stored in the memory.

Each processor may be a central processing unit (CPU), a network processor (NP), or a combination of a CPU and an NP.

In some embodiments, each processor may include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

Figure 10:
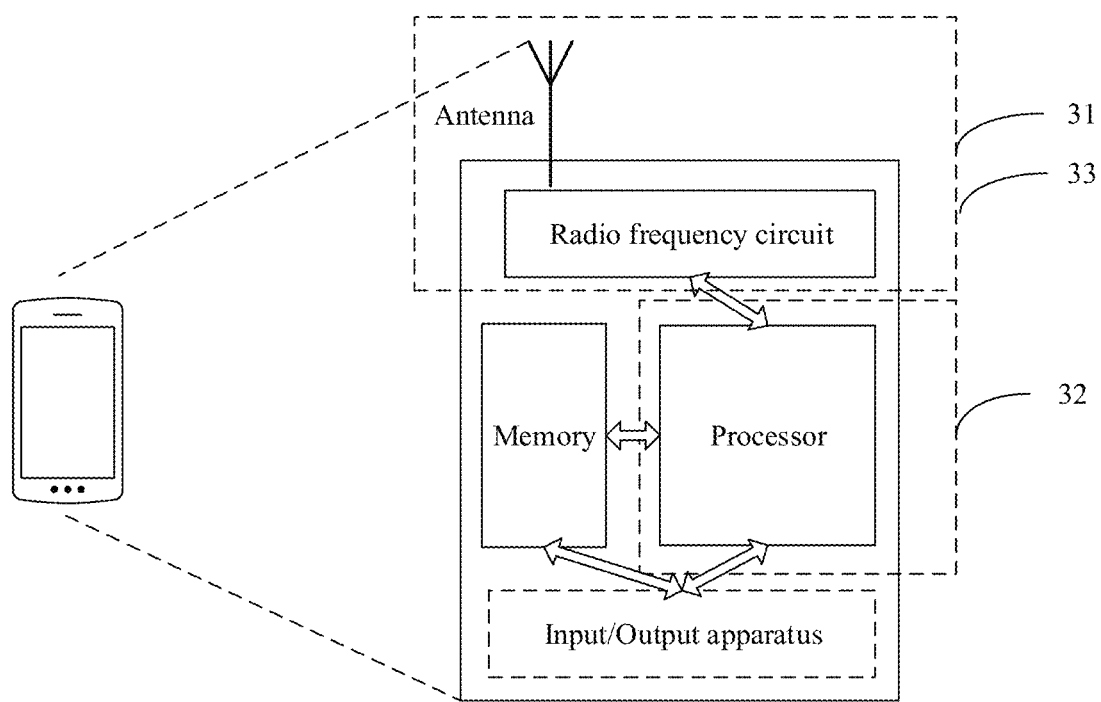
FIG. 10 is a schematic diagram of a structure of a simplified terminal device according to an embodiment of this application.

FIG. 10 is a schematic diagram of a structure of a simplified terminal device according to an embodiment of this application. For ease of understanding and convenience of figure illustration, an example in which the terminal device is a mobile phone is used in FIG. 10. As shown in FIG. 10, the terminal device includes at least one processor, and may further include a radio frequency circuit, an antenna, and an input/output apparatus. The processor may be configured to: process a communication protocol and communication data, and may be further configured to control the terminal device, execute a software program, process data of the software program, and the like. The terminal device may further include a memory. The memory is mainly configured to store software programs and data. These involved programs may be loaded into the memory when the communication apparatus is delivered from a factory, or may be loaded into the memory when needed later. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, and a keyboard, is mainly configured to receive data input by a user and output data to the user. It should be noted that some types of terminal devices may not have an input/output apparatus.

When data is to be sent, the processor performs baseband processing on to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor with a processing function may be considered as a processing unit of the terminal device. As shown in FIG. 10, the terminal device includes a receiving module 31, a processing module 32, and a sending module 33. The receiving module 31 may also be referred to as a receiver, a receiver, a receiver circuit, or the like. The sending module 33 may also be referred to as a transmitter, a transmitter, a transmitter, a transmitter circuit, or the like. The processing module 32 may also be referred to as a processor, a processing board, a processing module, a processing apparatus, or the like.

For example, the processing module 32 is configured to perform a function of the terminal device in operation 403 in the embodiment shown in FIG. 4 and a function of the terminal device in operation 704 in the embodiment shown in FIG. 7.

Figure 11:
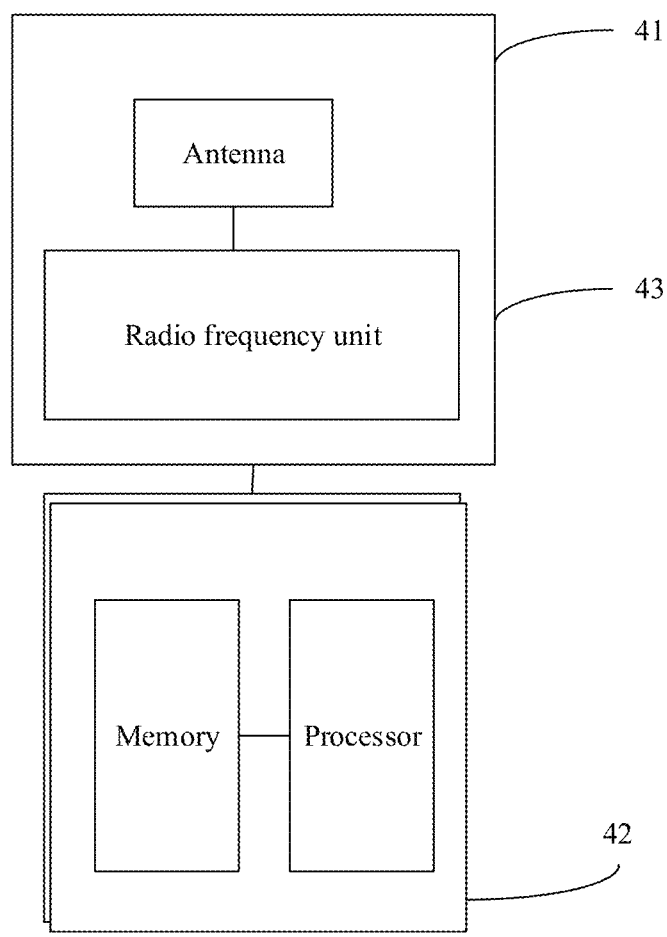
FIG. 11 is a schematic diagram of a structure of a simplified network device according to an embodiment of this application.

FIG. 11 is a schematic diagram of a structure of a simplified network device according to an embodiment of this application. The network device includes a radio frequency signal receiving/sending and conversion part and a part 42. The radio frequency signal receiving/sending and conversion part further includes a receiving module part 41 and a sending module part 43 (which may be collectively referred to as a transceiver module). The part for radio frequency signal transmission/reception and conversion is mainly configured to: send/receive a radio frequency signal and perform conversion between a radio frequency signal and a baseband signal. The part 42 is mainly configured to perform baseband processing, control the network device, and the like. The receiving module 41 may also be referred to as a receiver, a receiver, a receiver circuit, or the like. The sending module 43 may also be referred to as a transmitter, a transmitter, a transmitter, a transmitter circuit, or the like. The part 42 is usually a control center of the network device, and may be usually referred to as a processing module, configured to control the network device to perform the operations performed by the network device in FIG. 4 to FIG. 7. For details, refer to the foregoing descriptions of the related parts.

The part 42 may include one or more boards. Each board may include one or more processors and one or more memories. The processor is configured to read and execute a program in the memory to implement a baseband processing function and control the network device. If there is a plurality of boards, the boards may be interconnected to improve a processing capability. In an embodiment, a plurality of boards may share one or more processors, or a plurality of boards share one or more memories, or a plurality of boards simultaneously share one or more processors.

For example, the sending module 43 is configured to perform a function of the network device in operation 402 in the embodiment shown in FIG. 4 and a function of the network device in operations 702 and 703 in the embodiment shown in FIG. 7. The part 42 is configured to perform a function of the network device in operation 401 in the embodiment shown in FIG. 4 and a function of the network device in operations 701, 705, 706, and 707 in the embodiment shown in FIG. 7.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, division into units is merely logical function division and may be other division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using a computer-readable storage medium. The computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid state disk (SSD).

What is claimed is:

1. A communication method based on orbital angular momentum (OAM), comprising:
    determining OAM modes for at least two subframes of a radio frame, wherein at least one symbol is mapped to each subframe in the at least two subframes; and
    sending the at least two subframes, wherein there is an association relationship between the OAM modes corresponding to the subframes in the at least two subframes.

2. The method according to claim 1, wherein the OAM modes corresponding to adjacent subframes in the at least two subframes are different.

3. The method according to claim 2, wherein the OAM modes corresponding to the subframes in the at least two subframes are different.

4. The method according to claim 1, wherein the OAM modes corresponding to each subframe in the at least two subframes meets the following formula: (ml+nΔl),
    wherein both m and n are integers, l is an OAM mode in a first OAM mode sequence, and when a quantity of the OAM modes corresponding to the first OAM mode sequence is 1, Δl is 0, or when a quantity of the OAM modes corresponding to the first OAM mode sequence is greater than or equal to 2, Δl is a difference between adjacent OAM modes in the first OAM mode sequence.

5. The method according to claim 4, wherein the first OAM mode sequence comprises k OAM modes, and when k is 1, each OAM mode in the k OAM modes is a non-zero integer, or when k is greater than or equal to 2, each OAM mode in the k OAM modes is a non-zero integer, and the k OAM modes are different from each other.

6. The method according to claim 5, wherein when k is an even number greater than or equal to 2, the first OAM mode sequence comprises $$\frac{k}{2}$$

pairs of OAM modes; or when k is an odd number greater than 2, the first OAM mode sequence comprises $$\frac{k-1}{2}$$

pairs of OAM modes, where each pair of OAM modes in the $$\frac{k}{2}$$

pairs of OAM Modes and the $$\frac{k-1}{2}$$

pairs of OAM modes has opposite wavefront phases.

7. The method according to claim 4, wherein the method further comprises:
    obtaining a frequency shift of an uplink reference signal; and
    responsive to the frequency shift of the uplink reference signal being less than or equal to a first frequency shift, sending a second OAM mode sequence, or an initial OAM mode in the second OAM mode sequence and a difference between adjacent OAM modes in the second OAM mode sequence, wherein the difference between the adjacent OAM modes in the second OAM mode sequence is less than the difference between the adjacent OAM modes in the first OAM mode sequence; or
    responsive to the frequency shift of the uplink reference signal being greater than the first frequency shift, sending a third OAM mode sequence, or an initial OAM mode in the third OAM mode sequence and a difference between adjacent OAM modes in the third OAM mode sequence, wherein the difference between the adjacent OAM modes in the third OAM mode sequence is greater than the difference between the adjacent OAM modes in the first OAM mode sequence, and the difference between the adjacent OAM modes in the third OAM mode sequence is greater than the difference between the adjacent OAM modes in the second OAM mode sequence.

8. The method according to claim 7, wherein the method further comprises:
    sending second information, wherein the second information comprises a second field and the initial OAM mode in the second OAM mode sequence, or the second information comprises the second field and the initial OAM mode in the third OAM mode sequence,
    wherein the second field is used to indicate the difference between the adjacent OAM modes in the second OAM mode sequence or the difference between the adjacent OAM modes in the third OAM mode sequence, or the second field is used to indicate the difference between the adjacent OAM modes in the second OAM mode sequence and a second subcarrier spacing, or the difference between the adjacent OAM modes in the third OAM mode sequence and a third subcarrier spacing.

9. The method according to claim 8, wherein the sending the second information comprises: sending the second information by using a system information block, radio resource control signaling, or downlink control information.

10. A communication method based on orbital angular momentum (OAM), comprising:
   receiving a radio frame, wherein the radio frame comprises at least two subframes, at least one symbol is mapped to each subframe in the at least two subframes, and there is an association relationship between OAM modes corresponding to the subframes in the at least two subframes; and
   demodulating the radio frame based on the association relationship between the OAM modes corresponding to the subframes in the at least two subframes.

11. The method according to claim 10, wherein the OAM modes corresponding to adjacent subframes in the at least two subframes are different.

12. The method according to claim 11, wherein the OAM modes corresponding to the subframes in the at least two subframes are different.

13. The method according to claim 10, wherein the OAM modes corresponding to each subframe in the at least two subframes meets the following formula: (ml+nΔl), wherein
   both m and n are integers, l is an OAM mode in a first OAM mode sequence, and when a quantity of the OAM modes corresponding to the first OAM mode sequence is 1, Δl is 0, or when a quantity of the OAM modes corresponding to the first OAM mode sequence is greater than or equal to 2, Δl is a difference between adjacent OAM modes in the first OAM mode sequence.

14. The method according to claim 13, wherein the first OAM mode sequence comprises k OAM modes, and when k is 1, each OAM mode in the k OAM modes is a non-zero integer, or when k is greater than or equal to 2, each OAM mode in the k OAM modes is a non-zero integer, and the k OAM modes are different from each other.

15. The method according to claim 14, wherein when k is an even number greater than or equal to 2, the first OAM mode sequence comprises $$\frac{k}{2}$$

pairs of OAM modes; or when k is an odd number greater than or equal to 2, the first OAM mode sequence comprises $$\frac{k-1}{2}$$

pairs of OAM modes, wherein each pair of OAM modes in the $$\frac{k}{2}$$

pairs of OAM modes and the $$\frac{k-1}{2}$$

pairs of OAM modes has opposite wavefront phases.

16. The method according to claim 13, wherein the method further comprises:
   receiving a second OAM mode sequence, or an initial OAM mode in the second OAM mode sequence and a difference between adjacent OAM modes in the second OAM mode sequence, wherein the difference between the adjacent OAM modes in the second OAM mode sequence is less than the difference between the adjacent OAM modes in the first OAM mode sequence; or
   receiving a third OAM mode sequence, or an initial OAM mode in the third OAM mode sequence and a difference between adjacent OAM modes in the third OAM mode sequence, wherein the difference between the adjacent OAM modes in the third OAM mode sequence is greater than the difference between the adjacent OAM modes in the first OAM mode sequence, and the difference between the adjacent OAM modes in the third OAM mode sequence is greater than the difference between the adjacent OAM modes in the second OAM mode sequence.

17. The method according to claim 16, wherein the method further comprises:
   receiving second information, wherein the second information comprises a second field and the initial OAM mode in the second OAM mode sequence, or the second information comprises the second field and the initial OAM mode in the third OAM mode sequence, wherein the second field is used to indicate the difference between the adjacent OAM modes in the second OAM mode sequence or the difference between the adjacent OAM modes in the third OAM mode sequence, or the second field is used to indicate the difference between the adjacent OAM modes in the second OAM mode sequence and a second subcarrier spacing, or the difference between the adjacent OAM modes in the third OAM mode sequence and a third subcarrier spacing.

18. The method according to claim 17, wherein the receiving the second information comprises: receiving the second information by using a system information block, radio resource control signaling, or downlink control information.

19. A terminal device, comprising a processor, a memory, an input interface, and an output interface, wherein the input interface is configured to receive information from another communication apparatus other than the terminal device, the output interface is configured to output information to the another communication apparatus other than the terminal device, and the processor invokes a computer program stored in the memory to perform operations comprising:
   receiving a radio frame, wherein the radio frame comprises at least two subframes, at least one symbol is mapped to each subframe in the at least two subframes, and there is an association relationship between orbital angular momentum (OAM) modes corresponding to the subframes in the at least two subframes; and
   demodulating the radio frame based on the association relationship between the OAM modes corresponding to the subframes in the at least two subframes.

20. The terminal device according to claim 19, wherein the OAM modes corresponding to each subframe in the at least two subframes meet the following formula: $(ml+n\Delta l)$, wherein both m and n are integers, l is an OAM mode in a first OAM mode sequence, and when a quantity of the OAM modes corresponding to the first OAM mode sequence is 1, $\Delta l$ is 0, or when a quantity of the OAM modes corresponding to the first OAM mode sequence is greater than or equal to 2, $\Delta l$ is a difference between adjacent OAM modes in the first OAM mode sequence.

* * * * *